United States Patent
Doeden

(10) Patent No.: US 7,371,039 B2
(45) Date of Patent: May 13, 2008

(54) SLAT REPLACEMENT SYSTEM

(76) Inventor: Kenneth Doeden, 617 160th Ave., Slayton, MN (US) 56172

( * ) Notice: Subject to any disclaimer, the term of this patent is extended or adjusted under 35 U.S.C. 154(b) by 84 days.

(21) Appl. No.: 11/099,822

(22) Filed: Apr. 6, 2005

(65) Prior Publication Data

US 2005/0175437 A1    Aug. 11, 2005

Related U.S. Application Data

(63) Continuation-in-part of application No. 10/194,864, filed on Jul. 12, 2002, now Pat. No. 6,910,846.

(51) Int. Cl.
*B66F 11/00* (2006.01)

(52) U.S. Cl. .................. 414/589; 212/901
(58) Field of Classification Search ............ 414/590, 414/589, 680; 212/230, 301, 306, 901; 294/106
See application file for complete search history.

(56) References Cited

U.S. PATENT DOCUMENTS

| | | | |
|---|---|---|---|
| 710,391 A | 9/1902 | Haws | |
| 974,372 A | 11/1910 | Fullenkamp | |
| 2,804,979 A * | 9/1957 | Lassiter | 212/301 |
| 2,974,809 A * | 3/1961 | Sellars et al. | 212/203 |
| 3,469,816 A | 9/1969 | Blough et al. | |
| 3,530,999 A * | 9/1970 | Naruns | 212/197 |
| 3,656,729 A | 4/1972 | Borgert | |
| 4,659,276 A | 4/1987 | Billett | |
| 5,064,334 A | 11/1991 | Cooley | |
| 5,120,186 A | 6/1992 | Jorgenson | |
| 5,193,873 A | 3/1993 | Juliusz et al. | |
| 5,758,785 A | 6/1998 | Spinnosa et al. | |
| 5,792,394 A | 8/1998 | Ellis | |

* cited by examiner

*Primary Examiner*—Donald Underwood
(74) *Attorney, Agent, or Firm*—Jeffrey A. Proehl; Woods, Fuller, Shultz & Smith, PC

(57) ABSTRACT

A slat replacement system for removing damaged slats and inserting new slats in an animal pen. The slat replacement system includes a base assembly for resting on a floor of the animal pen. A frame member is rotatably coupled to the base assembly. A motor assembly is operationally coupled to a drive assembly and is coupled to the frame member. The drive assembly is operationally coupled to the base assembly for rotating the frame member with respect to the base assembly. A lifting assembly is pivotally coupled to the frame member and operationally coupled to the drive assembly for pivoting the lifting assembly with respect to the frame member for lifting and moving of one of the slats. A control assembly is operationally coupled to the drive assembly for controlling rotation of the frame member with respect to the base assembly and pivoting of the lifting assembly.

15 Claims, 12 Drawing Sheets

SLAT REPLACEMENT SYSTEM

REFERENCE TO RELATED APPLICATION

This application is a continuation-in-part of my U.S. patent application Ser. No. 10/194,864, filed Jul. 12, 2002 now U.S. Pat. No. 6,910,486.

BACKGROUND OF THE INVENTION

1. Field of the Invention

The present invention relates to animal pen slat repair methods and more particularly pertains to a new slat replacement system for removing damaged slats and inserting new slats in an animal pen.

2. Description of the Prior Art

The use of animal pen slat repair methods is known in the prior art. U.S. Pat. No. 5,792,394 describes a method for repairing pen slats of an animal pen. Another type of animal pen slat repair method is U.S. Pat. No. 3,656,729 having a mold for casting a T-shaped slat useable in slotted floors. U.S. Pat. Nos. 974,372, 3,469,816 and 710,391 each have a mold for forming a T-shaped slat for use in animal pens. U.S. Pat. Nos. 4,659,276 and 5,120,186 each have an apparatus for handling loads.

While these devices fulfill their respective, particular objectives and requirements, the need remains for a system that includes certain improved features allow for damaged slats to be removed and replaced with new slats.

SUMMARY OF THE INVENTION

The present invention meets the needs presented above by providing a base assembly that distributes weight over a greater area to prevent the slat replacement system from breaking through the damaged slats.

Still yet another object of the present invention is to provide a new slat replacement system that allows for lifting and repositioning of the slat to be removed or replaced.

To this end, the present invention generally comprises a base assembly being designed for resting on a floor of the animal pen. A frame member is rotatably coupled to the base assembly. A motor assembly is operationally coupled to a drive assembly whereby the motor assembly is for actuating the drive assembly. The motor assembly and the drive assembly are coupled to the frame member. The drive assembly is operationally coupled to the base assembly whereby the drive assembly rotates the frame member with respect to the base assembly when the drive assembly is actuated by the user. A lifting assembly is pivotally coupled to the frame member. The lifting assembly is operationally coupled to the drive assembly whereby the drive assembly is for pivoting the lifting assembly with respect to the frame member. The lifting assembly is designed for being coupled to one of the slats for facilitating lifting and moving of one of the slats. A control assembly is operationally coupled to the drive assembly. The control assembly actuates the drive assembly for controlling rotation of the frame member with respect to the base assembly and pivoting of the lifting assembly with respect to the frame member when the control assembly is actuated by a user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
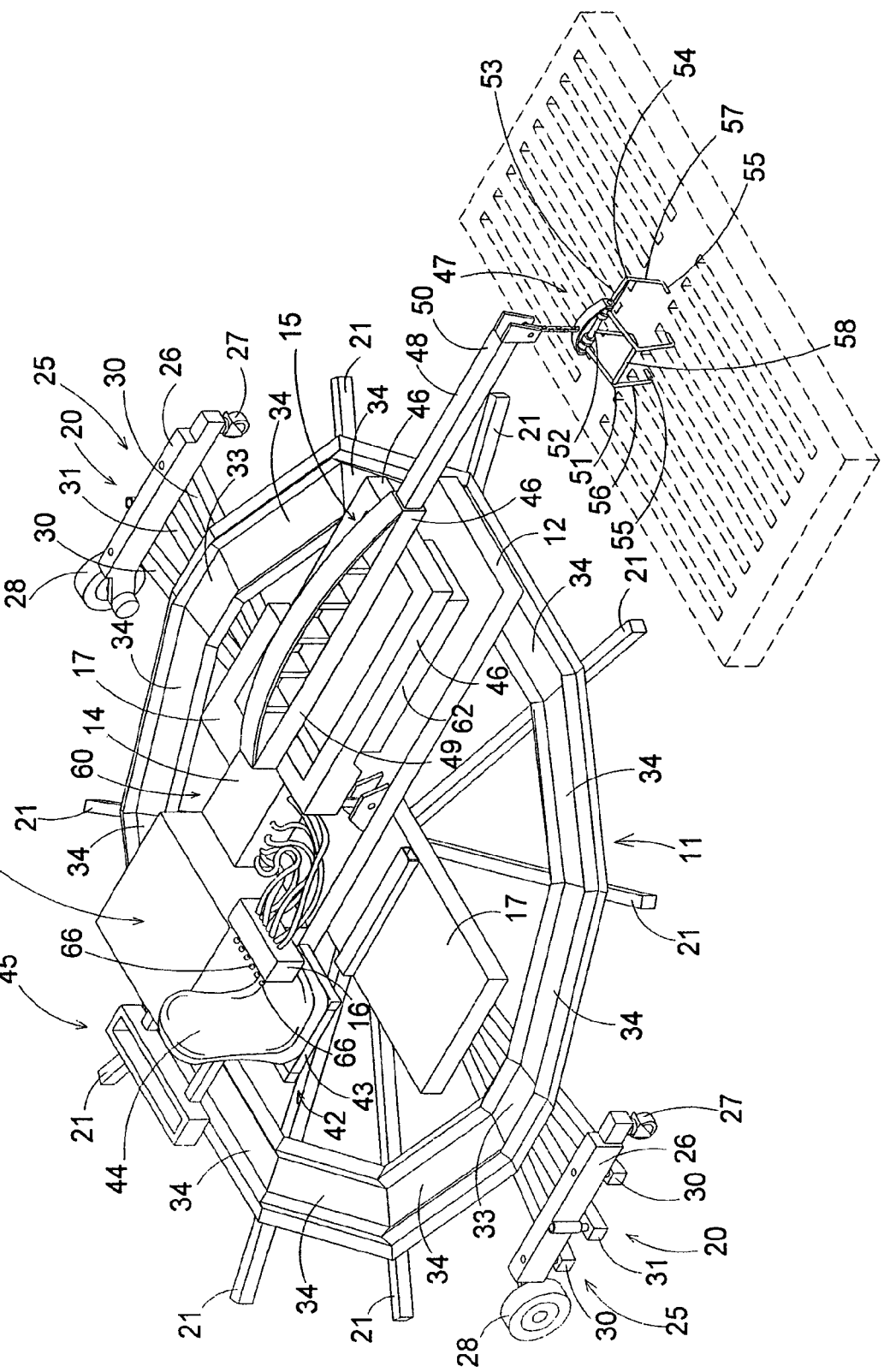
FIG. 1 is a perspective view of a new slat replacement system according to the present invention shown in use.
Figure 2:
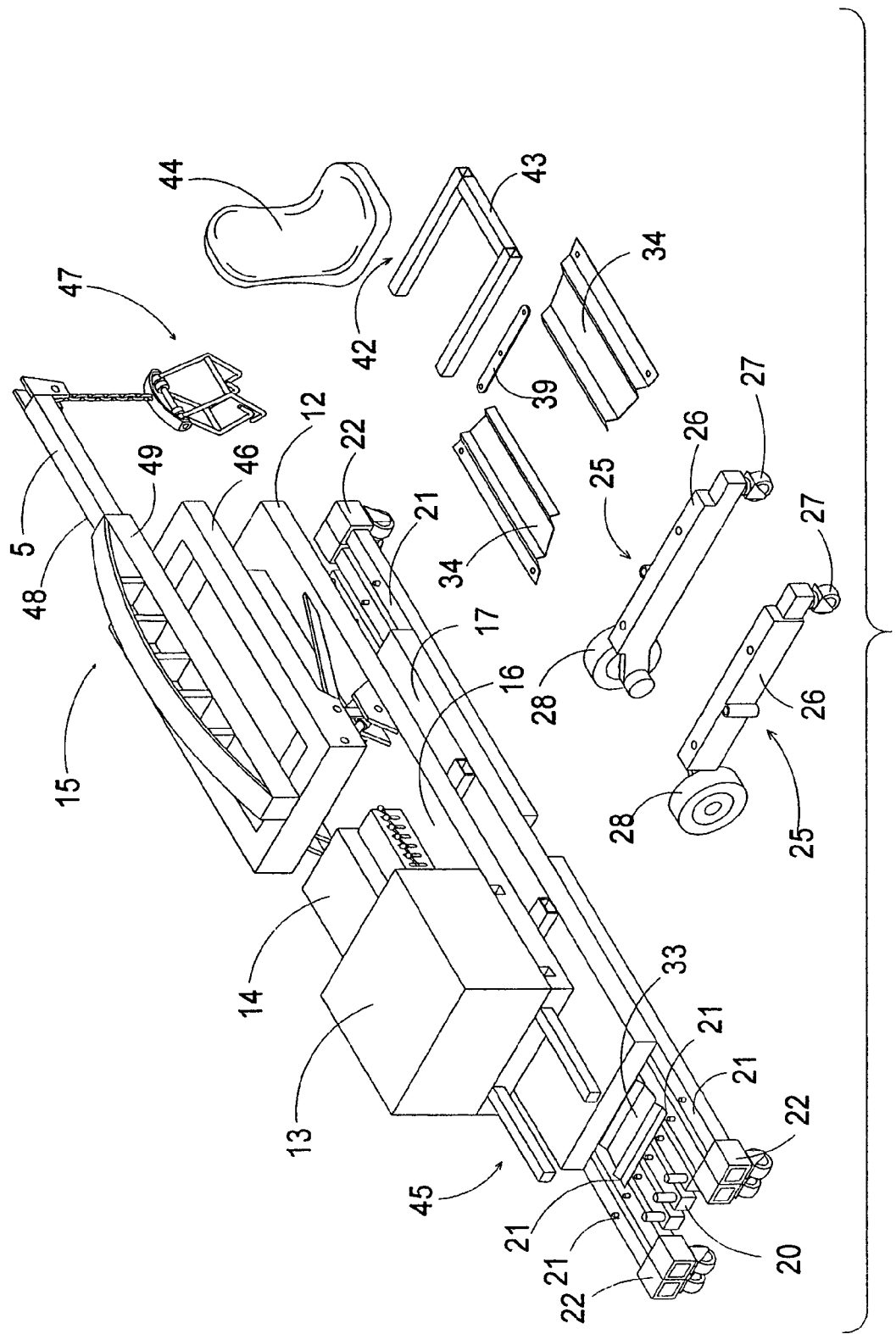
FIG. 2 is an exploded perspective view of the present invention.
Figure 3:
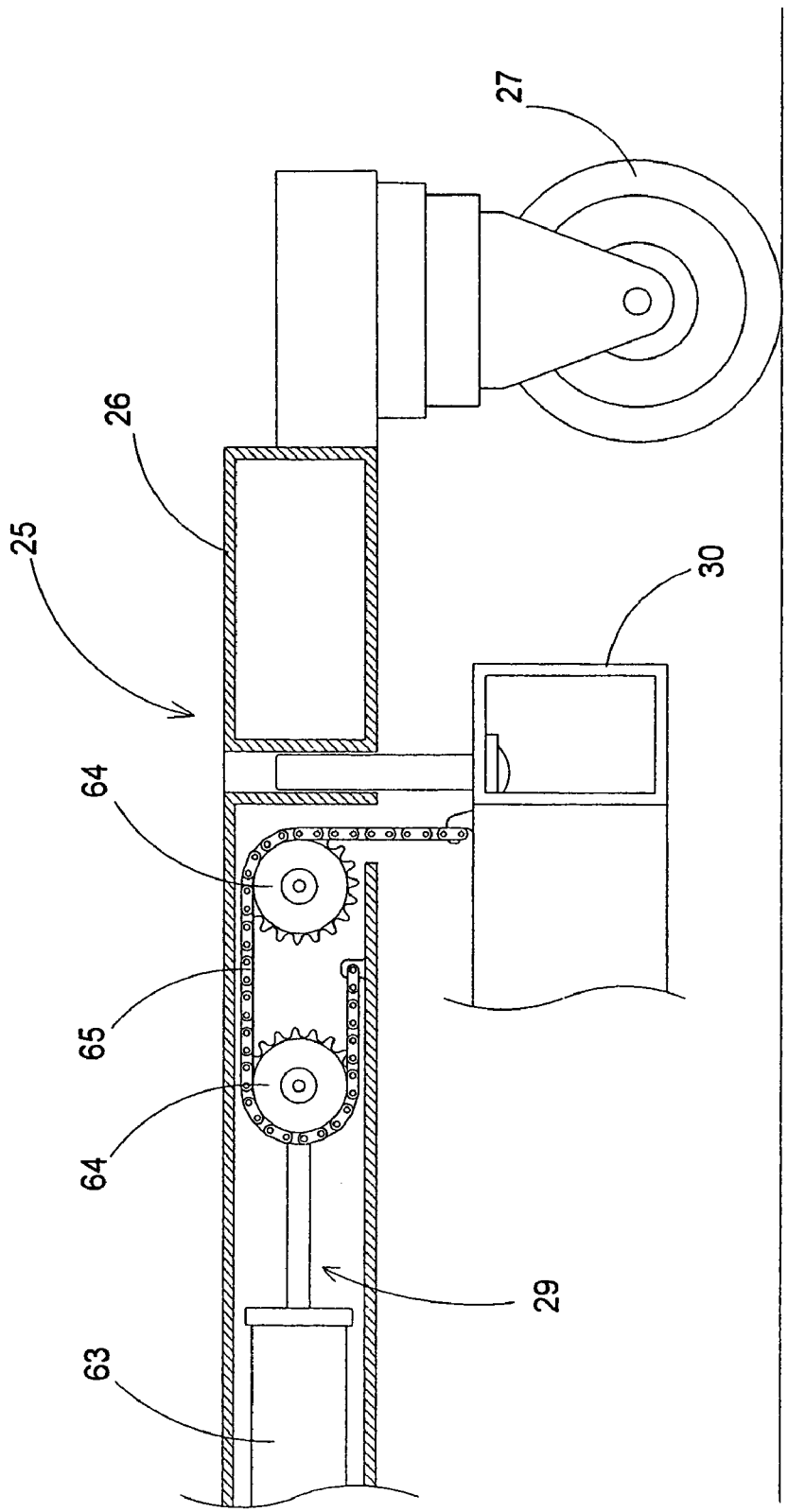
FIG. 3 is a cross-sectional view of the positioning assembly of the present invention.
Figure 4:
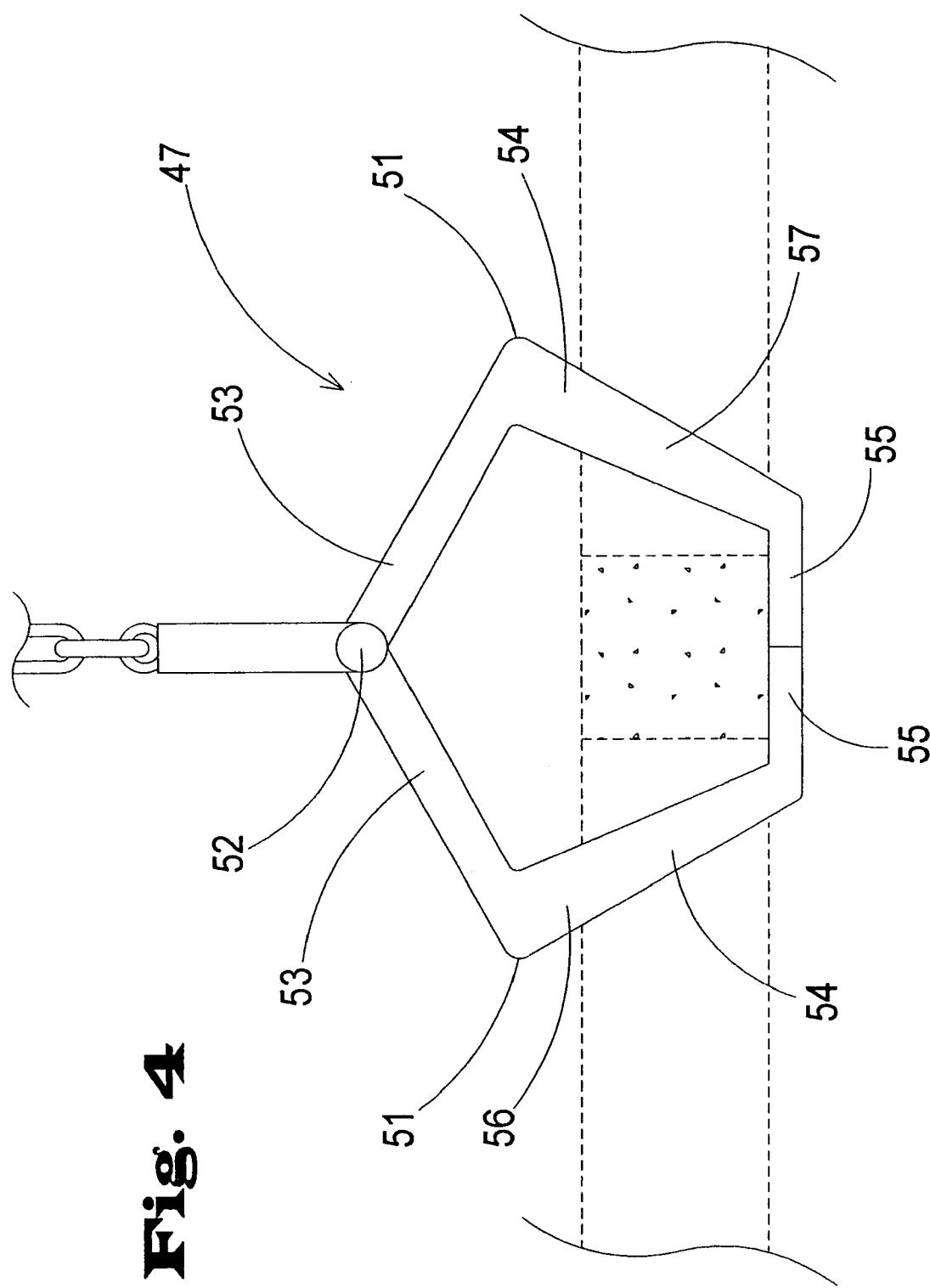
FIG. 4 is a side view of the clamping assembly of the present invention.
Figure 5:
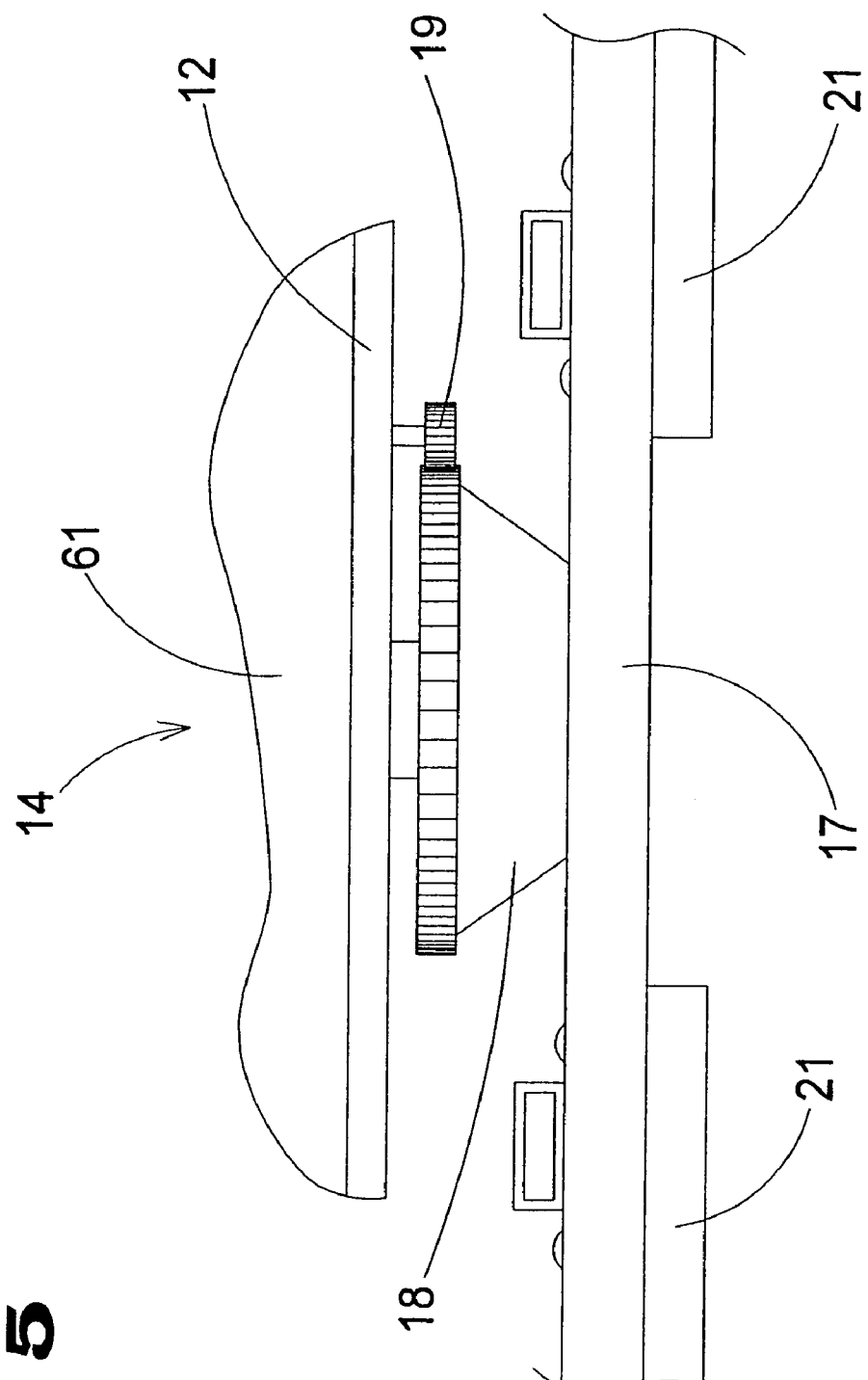
FIG. 5 is a side view of the transition cog wheel of the present invention.
Figure 6:
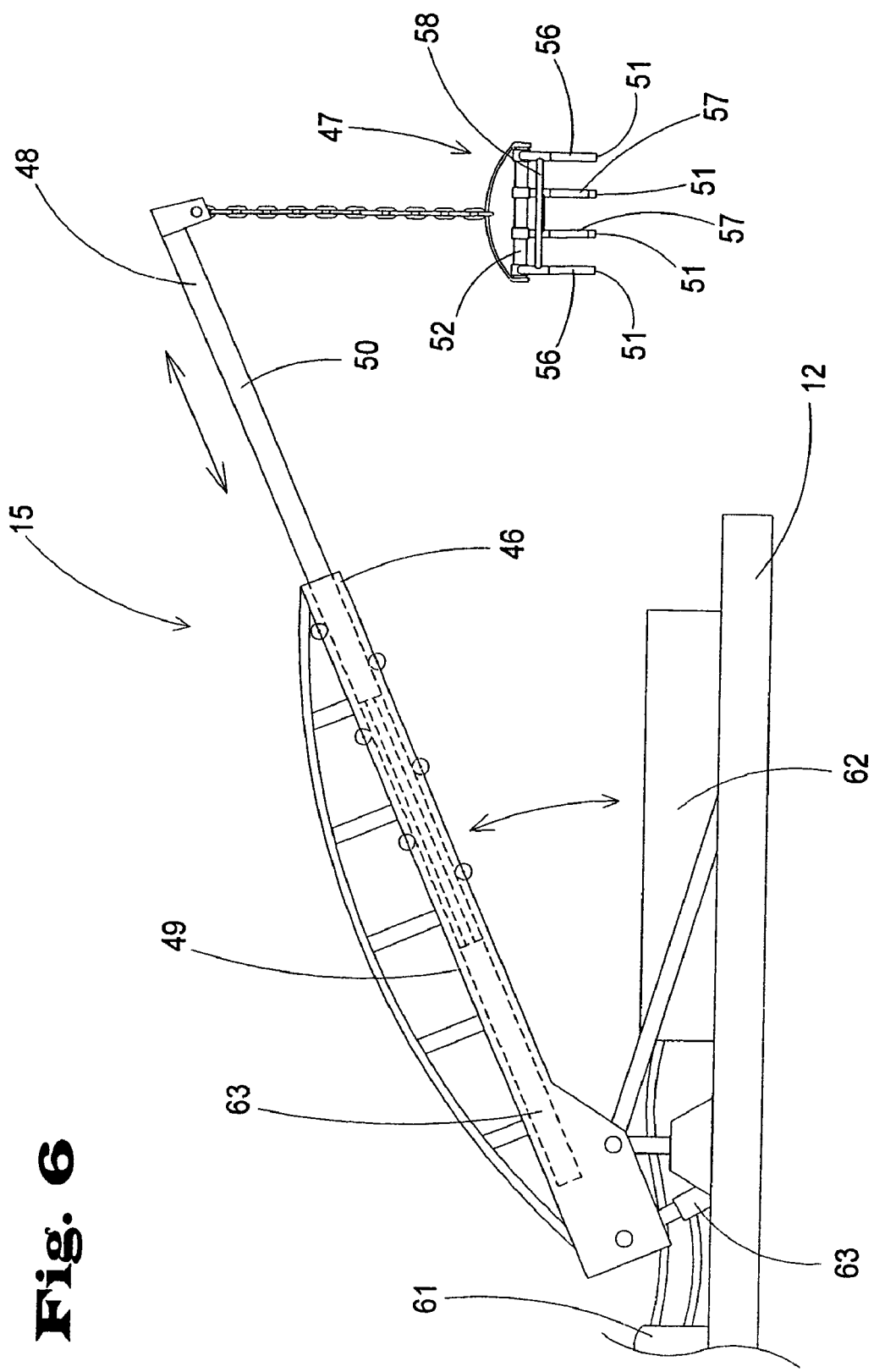
FIG. 6 is a side view of the lifting assembly of the present invention.
Figure 7:
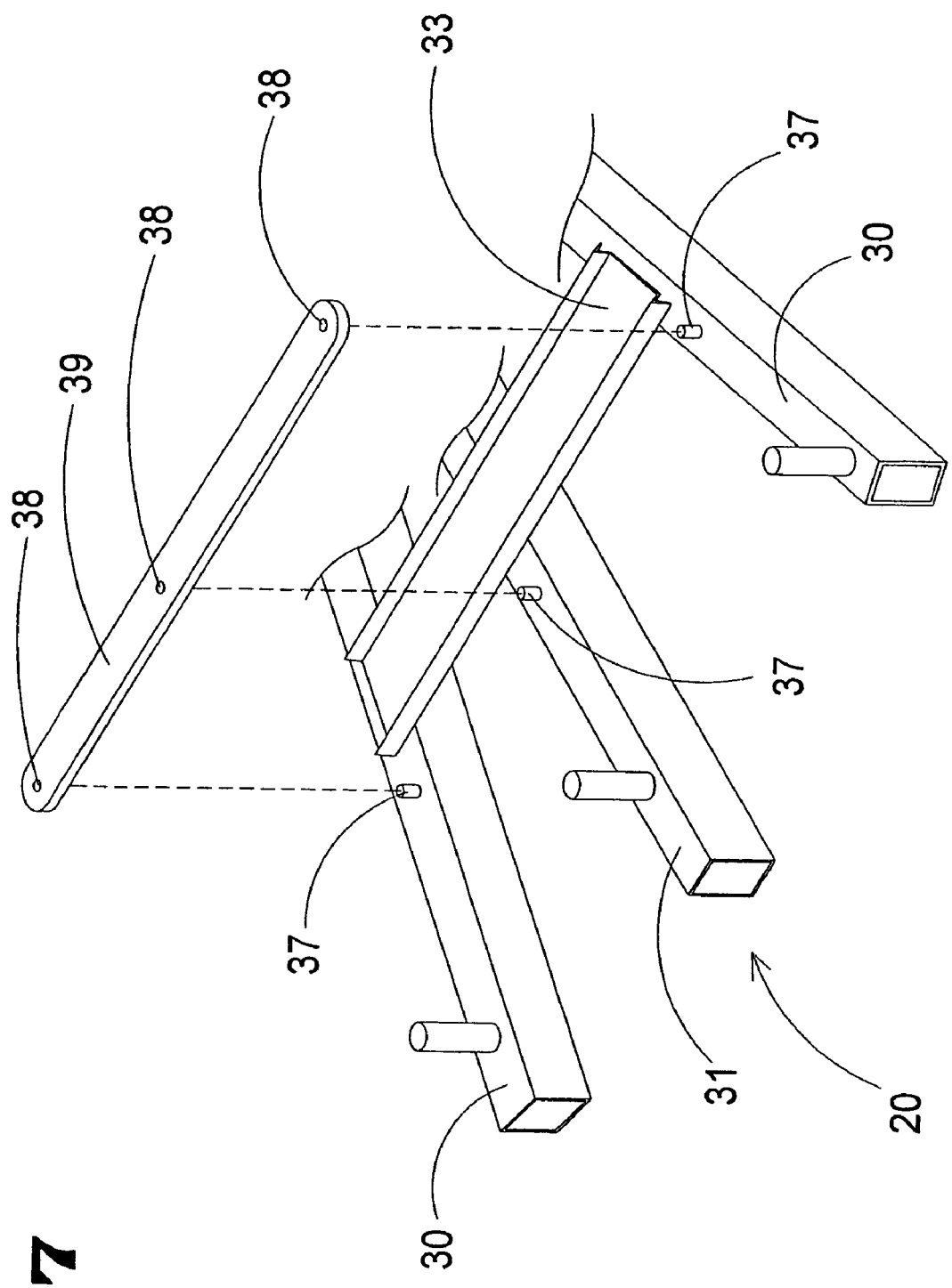
FIG. 7 is an exploded perspective view of the support members of the present invention.
Figure 8:
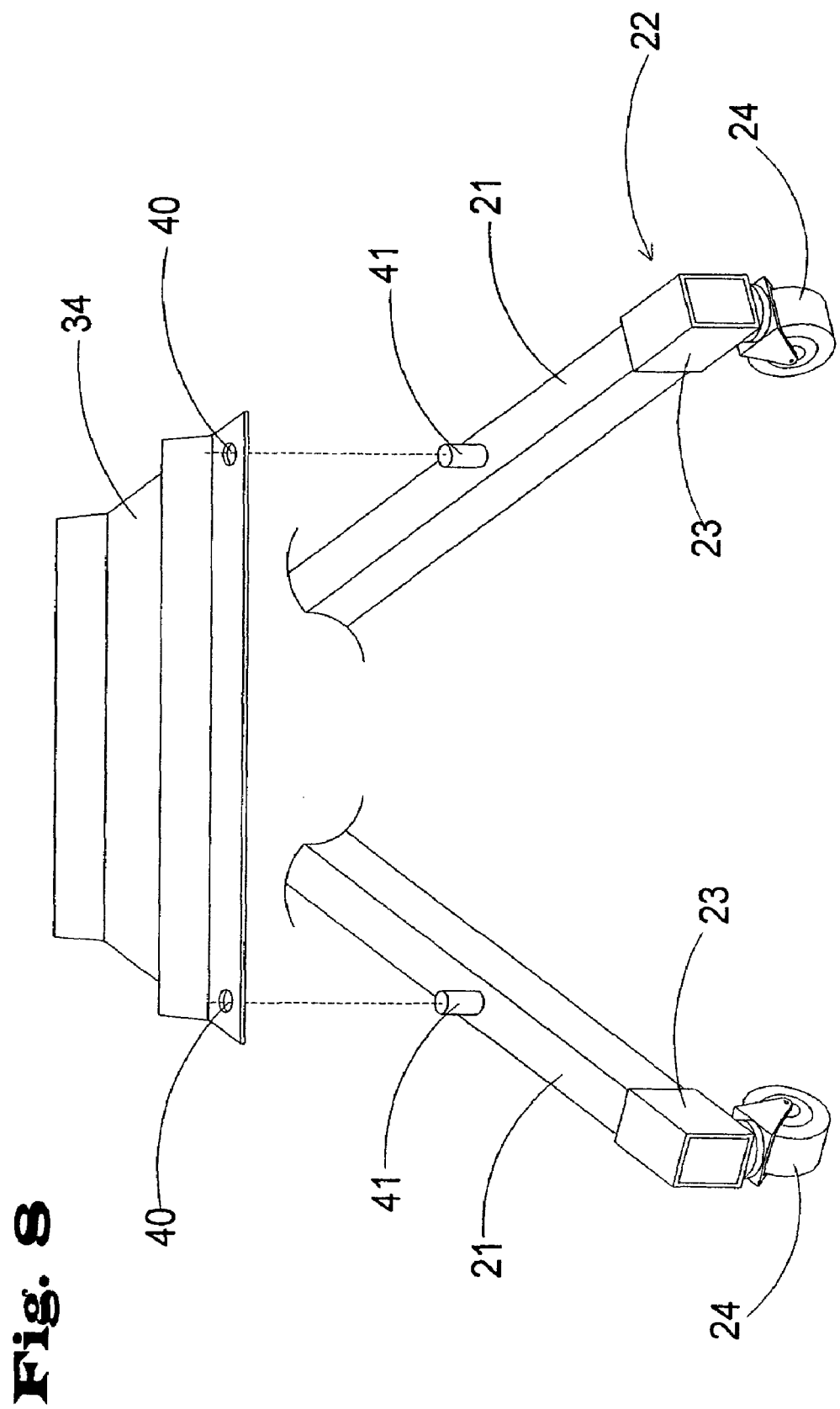
FIG. 8 is an exploded perspective view of a pair of the leg members of the present invention.
Figure 9:
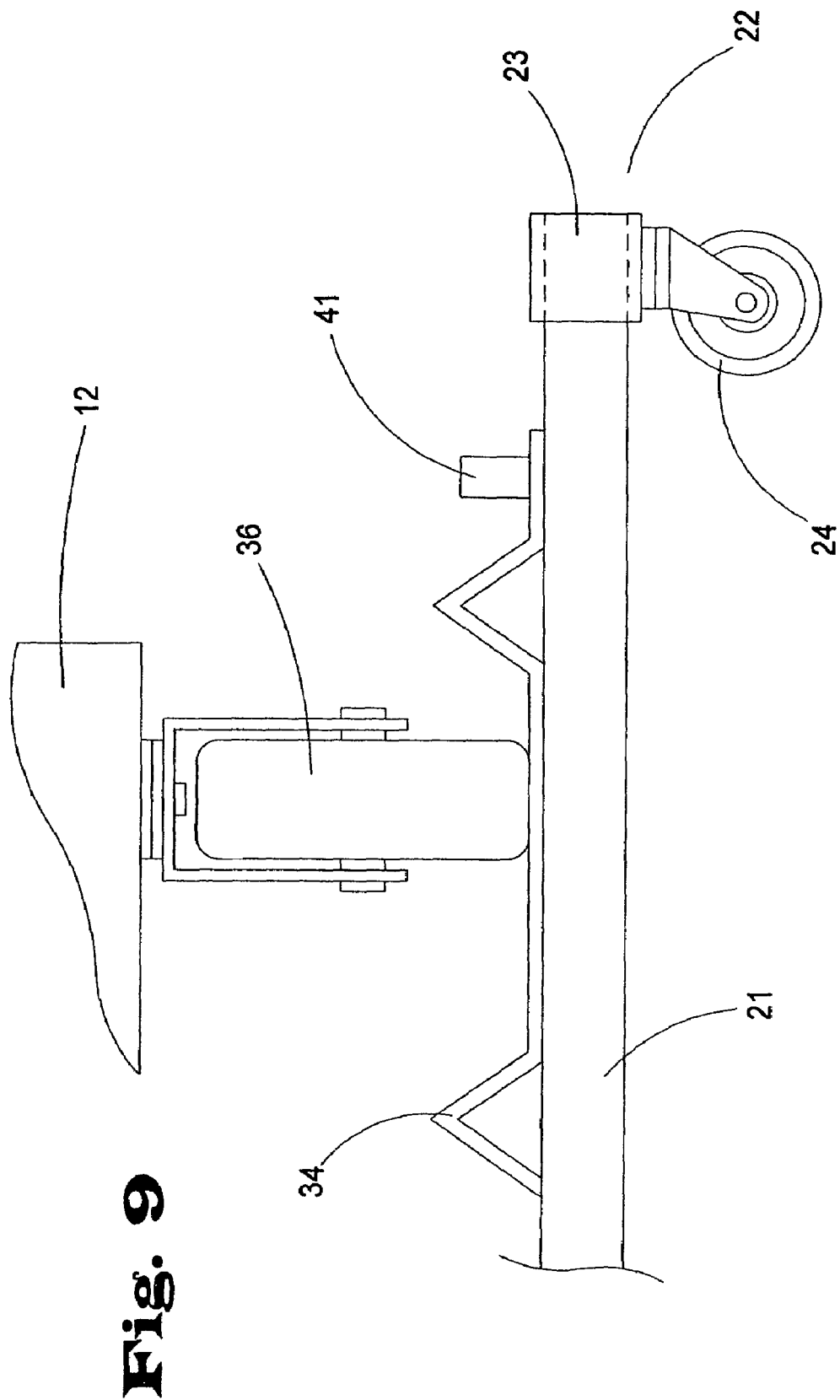
FIG. 9 is a side view of one of the leg members of the present invention.

With reference now to the drawings, and in particular to FIGS. 1 through 9 thereof, a new slat replacement system embodying the principles and concepts of the present invention and generally designated by the reference numeral 10 will be described.

As best illustrated in FIGS. 1 through 9, one embodiment of the slat replacement system 10 generally comprises a base assembly 11 being designed for resting on a floor of the animal pen. A frame member 12 is rotatably coupled to the base assembly 11.

A motor assembly 13 is operationally coupled to a drive assembly 14 whereby the motor assembly 13 is for actuating the drive assembly 14. The motor assembly 13 and the drive assembly 14 are coupled to the frame member 12. The drive assembly 14 is operationally coupled to the base assembly 11 whereby the drive assembly 14 rotates the frame member 12 with respect to the base assembly 11 when the drive assembly 14 is actuated by the user.

A lifting assembly 15 is pivotally coupled to the frame member 12. The lifting assembly 15 is operationally coupled to the drive assembly 14 whereby the drive assembly 14 is for pivoting the lifting assembly 15 with respect to the frame member 12. The lifting assembly 15 is designed for being coupled to one of the slats for facilitating lifting and moving of one of the slats.

A control assembly 16 is operationally coupled to the drive assembly 14. The control assembly 16 actuates the drive assembly 14 for controlling rotation of the frame member 12 with respect to the base assembly 11 and pivoting of the lifting assembly 15 with respect to the frame member 12 when the control assembly 16 is actuated by a user.

The base assembly 11 comprises a base plate 17 and a transition cog wheel 18. The transition cog wheel 18 is coupled to the base assembly 11. The transition cog wheel 18 is rotatably coupled to the frame member 12. The drive assembly 14 comprises a rotational cog wheel 19 whereby the rotational cog wheel 19 is rotatable with respect to the frame member 12. The rotational cog wheel 19 of the drive assembly 14 is operationally coupled to the transition cog wheel 18 whereby rotation of the rotation cog wheel rotates the frame member 12 with respect to the base plate 17.

The base assembly 11 comprises a plurality of sets of support members 20. Each of the sets of support members 20 is coupled to the base plate 17 whereby one of the sets of support members 20 is positioned opposite the other of the support members. Each of the sets of support members 20 is designed for engaging the floor of the animal pen for supporting the base plate 17 from the floor of the animal pen.

The base assembly 11 comprises a plurality of leg members 21. Each of the leg members 21 is pivotally coupled to the base plate 17 whereby each of the leg members 21 is pivotal between a stored position and a deployed position. Each of the leg members 21 is positioned between the sets of support members 20. Each of the leg members 21 is designed for engaging the floor of the animal pen when each of the leg members 21 is in the deployed position for providing support for the base plate 17. Each of a plurality of caster assemblies 22 is selectively coupled to one of the leg members 21 of the base assembly 11. Each of the caster assemblies 22 comprises a receiving sleeve 23 and a caster portion 24. The receiving sleeve 23 selectively receives the associated one of leg members 21 when the leg members 21 are in the stored position and being pivoted to the deployed position. The caster portion 24 is coupled to the receiving sleeve 23 such that the caster portion 24 facilitates movement of the associated one of leg members 21 across the floor of the animal pen. Each of the caster assemblies 22 is selectively removable from the associated one of the leg members 21 to permit the leg members 21 to directly contact the floor of the animal pen when the leg members 21 are in the deployed position.

The base assembly 11 comprises a plurality of positioning assemblies 25. Each of the positioning assemblies 25 is coupled to one of the sets of support members 20. Each of the positioning assemblies 25 is for vertically positioning the associated one of the sets of support members 20 with respect to the floor of the animal pen for allowing repositioning of the base plate 17.

Each of the positioning assemblies 25 comprises a span member 26, a roller portion 27 and a wheel portion 28. The span member 26 is coupled to the associated one of the sets of support members 20. The roller portion 27 is pivotally coupled to the span member 26. The wheel portion 28 is rotatably coupled to the span member 26 opposite the roller portion 27. The wheel portion 28 is operationally coupled to the drive assembly 14 whereby the drive assembly 14 rotates the wheel portion 28 for moving the base plate 17 across the floor of the animal pen.

Each of the positioning assemblies 25 comprises a raising assembly 29. The raising assembly 29 is coupled to the span member 26 of the associated one of the positioning assemblies 25. The raising assembly 29 is operationally coupled to at least one of the support members of the associated one of the sets of support members 20 whereby the raising assembly 29 selectively lifts the associated one of the sets of supports members with respect to the floor in the animal pen. The raising assembly 29 is operationally coupled to the drive assembly 14 whereby the drive assembly 14 actuates the raising assembly 29 to vertically adjust the associated one of the sets of support members 20 with respect to the floor of the animal pen when the drive assembly 14 is actuated by the user.

Each of the sets of support members 20 comprises a pair of end support members 30 and a center support member 32. Each of the end support members 30 is pivotally coupled to the base plate 17 whereby each of the end support members 30 are pivotal between a deployed position and a stored position. The center support member 32 is coupled to the base plate 17 whereby the center support member 32 is positioned between the end support members 30. The end support members 30 and the center support member 32 are designed for selectively engaging the floor of the animal pen when the end support members 30 are in the deployed position. When the end support members 30 and the leg members 21 are positioned in the stored position the system can be easily positioned through a door leading into the animal pen.

The base assembly 11 comprises a pair of base channel members 33 and a plurality side channel members 34. Each of the base channel members 33 is coupled to one of the sets of support members 20. Each of the channel members is selectively coupled to at least one of the leg members 21 when the leg members 21 are in the deployed position. The base channel members 33 and the side channel members 34 form a guide track 35 for receiving a dolly wheel 36 rotatably coupled to the frame member 12 for facilitating rotation of the frame member 12 with respect to the base assembly 11 when the leg members 21 are in the deployed position. Each of the end support members 30 and the center support member 32 has a peg member 37. The peg member 37 of the end support members 30 and center member each being insertable into a peg aperture 38 of an alignment member 41 39 such that the alignment member 41 39 is for maintaining the orientation of the end support members 30 and the center support member 32 when the end support members 30 are in the deployed position. Each of the side channel members 34 comprising a pair of alignment apertures 40. Each of the alignment apertures 40 selectively receives an alignment member 41 39 of an associated one of the leg members 21 for maintaining alignment of the leg members 21 when the leg members 21 are in the deployed position.

The control assembly 16 is rotatably coupled to the frame member 12 whereby the control assembly 16 is rotatable between a deployed position and a stored position. The stored position of the control assembly 16 is defined by a longitudinal axis of the control assembly 16 is positioned substantially parallel to a longitudinal axis of the frame member 12. The deployed position of the control assembly 16 is defined by the longitudinal axis of the control assembly 16 being substantially perpendicular to the longitudinal axis of the frame member 12 whereby the control assembly 16 is designed for being accessed by the user for controlling the drive assembly 14 when the control assembly 16 is in the deployed position.

A seating assembly 42 is selectively coupled to the frame member 12. The seating assembly 42 extends outwardly from the frame member 12. The seating assembly 42 is designed for receiving the user for positioning the user adjacent the control assembly 16. The seating assembly 42 comprises a seat frame 43 and a seat member 44. The seat frame 43 is selectively coupled to the frame member 12. The seat member 44 is selectively coupled to the seat frame 43 opposite the frame member 12 whereby the seat member 44 is adjustable for positioning the user with respect to the control assembly 16.

A balancing assembly 45 is slidably coupled to the frame member 12 opposite the lifting assembly 15. The balancing assembly 45 is operationally coupled to the drive assembly 14 whereby the balancing assembly 45 is adjustable with respect to the frame member 12. The balancing assembly 45 is designed for receiving weights whereby the balancing assembly 45 is for balancing the weight of one of the slats when the lifting assembly 15 is lifting the associated one of the slats.

The lifting assembly 15 comprises a lifting frame 46. The lifting frame 46 is pivotally coupled to the frame member 12. The lifting frame 46 is operationally coupled to the drive assembly 14 whereby the drive assembly 14 pivots the lifting frame 46 with respect to the frame member 12 when the drive assembly 14 is actuated by the user. The lifting frame 46 is designed for lifting and lowering one of the slats when the lifting frame 46 is pivoted with respect to the frame member 12.

The lifting assembly 15 comprises a clamping assembly 47. The clamping assembly 47 is coupled to an arm portion 48 of the lifting assembly 15 coupled to the lifting frame 46. The clamping assembly 47 is designed for engaging one of the slats for securing one of the slats to the lifting assembly 15 for lifting and lowering one of the slats.

The arm portion 48 of the lifting assembly 15 comprises a sleeve member 49 and a boom member 50. The sleeve member 49 slidably receives the boom member 50 whereby the boom member 50 is telescopic from the sleeve member 49. The boom member 50 is operationally coupled to the drive assembly 14 for selectively sliding the boom member 50 with respect to the sleeve member 49 for changing the distance between the frame member 12 and one of the slats when the drive member is actuated by the user.

The clamping assembly 47 of the lifting assembly 15 comprises a plurality of finger portions 51 and a pivot rod 52. The finger portions 51 are pivotally coupled to the pivot rod 52. Each of the finger portions 51 is designed for extending through one of a plurality of slots in one of the slats and engaging a center portion of the associated one of the slats for securing the associated one of the slats to the lifting assembly 15.

Each of the finger portions 51 of the clamping assembly 47 comprises a proximal member 53, a medial member 54 and a distal member 55. The proximal member 53 is pivotally coupled to the pivot rod 52 of the clamping assembly 47. The medial member 54 is coupled to the proximal member 53 opposite the pivot rod 52. The distal member 55 is coupled to the medial member 54 opposite the proximal member 53 whereby the associated one of the finger portions 51 is substantially U-shaped for receiving the center portion of the associated one of the slats for inhibiting shifting of the associated one of the slats when one of the slats is being moved.

The finger portions 51 of the clamping assembly 47 comprise a pair of exterior finger portions 56 and a pair of interior finger portions 57. An exterior brace 59 is coupled between the exterior finger portions 56 for maintaining alignment of the exterior finger portions 56 when the exterior finger portions 56 are selectively secured to one of the slats. An interior brace is coupled between the interior finger portions 57 for maintaining alignment of the interior finger portions 57 when the interior finger portions 57 are selectively secured to the associated one of the slats.

The drive assembly 14 comprises a hydraulic system 60 having a hydraulic pump 61, a reservoir 62 and a plurality of rams 63. The hydraulic pump 61 is operationally coupled to the motor assembly 13 so that the motor assembly 13 drives the hydraulic pump 61 for pumping hydraulic fluid through out the hydraulic system 60. The wheel portion 28 of each of the positioning assemblies 25 is in hydraulic communication with hydraulic pump 61 for rotating the wheel portion 28 to propel the base assembly 11 across the floor of the animal pen. The rams 63 of the hydraulic system 60 are coupled to the hydraulic pump 61 for moving desired objects. In the case of the raising assembly 29 of each of the positioning assemblies 25 comprises a ram coupled to one of a pair of sprockets 64. A chain 65 extends from the bottom and around of the sprocket coupled to the ram and extends to the top of the other sprocket and down to connect to the associated one of the end support members 30. As the ram draws the sprockets 64 apart the chain 65 draws the associated one of the end support members 30 up away from the floor of the animal pen to allow for repositioning of the base assembly 11. The control assembly 16 comprises a plurality of the levers 66 being in fluid communication with the hydraulic pump 61 such that actuation of the levers 66 controls the pressure of the hydraulic fluid to desired actuators.

In use, the user uses a fork lift to engage the base assembly 11 to position base assembly 11 in the animal pen. The leg members 21 and the support members are moved into the deployed position. The channel members are coupled to the leg members 21 to allow the dolly wheel 36 to roll around the channel members to facilitate rotation of the frame member 12 with respect to the base assembly 11. Each of the positioning assemblies 25 is coupled to the associated support members. The user then sits in the seating assembly 42 with the control assembly 16 positioned in front of them. The positioning assemblies 25 lift the base assembly 11 and allow the caster assemblies 22 to be removed from the leg members 21 and allow for the base assembly 11 to be moved along the floor of the animal pen. When the base assembly 11 is positioned in the desired location the positioning assemblies 25 lower the base assembly 11 to let the leg members 21 and support members to rest upon the floor of the animal. The control assembly 16 allows the user to rotate the frame member 12 with respect to the base member, actuate the balancing assembly 45 to balance the weight of the slat and actuate the lifting assembly 15 to lift and lower the slats.

It will be appreciated from the foregoing that the plurality of leg members, especially in the deployed position, serve to spread out and distribute the weight of the system 10 (and a slat being lifted) over a relatively larger area than the area of the frame member itself, which is important for operation on floors formed of slats that normally would support significant weight but may have compromised strength due to deterioration. The outer ends of the leg members define a support perimeter over which the leg members extends and distribute the weight of the apparatus. The area within the perimeter occupied by the deployed leg members may be substantially circular in shape, due to the pivot movement of the leg members into a configuration in which the leg members radiate outwardly from a central location. In one preferred embodiment, the substantially circular area has a diameter measurement of approximately ten feet, so that an area of approximately 80 square feet is defined over which the leg members distribute the weight of the system 10. In the stored position, the area occupied by the leg members may be substantially rectangular in shape, due to the parallel arrangement of the leg members in the stored position. In one preferred embodiment, the substantially rectangular area extends approximately three foot wide by approximately ten foot long, so that the area of approximately thirty square feet is defined over which the weight of the system 10 is distributed. The pivotability of the leg members between the stored position and the deployed position permits the area or extent of the base assembly to be diminished to permit the system 10 to move through constricted opening in buildings, such as walk-though doorways, while providing the ability to distribute the weight of the system while in the deployed position. In some embodiments of the invention, in the deployed position, each of the leg members is separated from an adjacent one of the leg members by an angle of less than 90 degrees, and the angle may range between approximately 25 and 35 degrees, and may be approximately 30 degrees.

Figure 10:
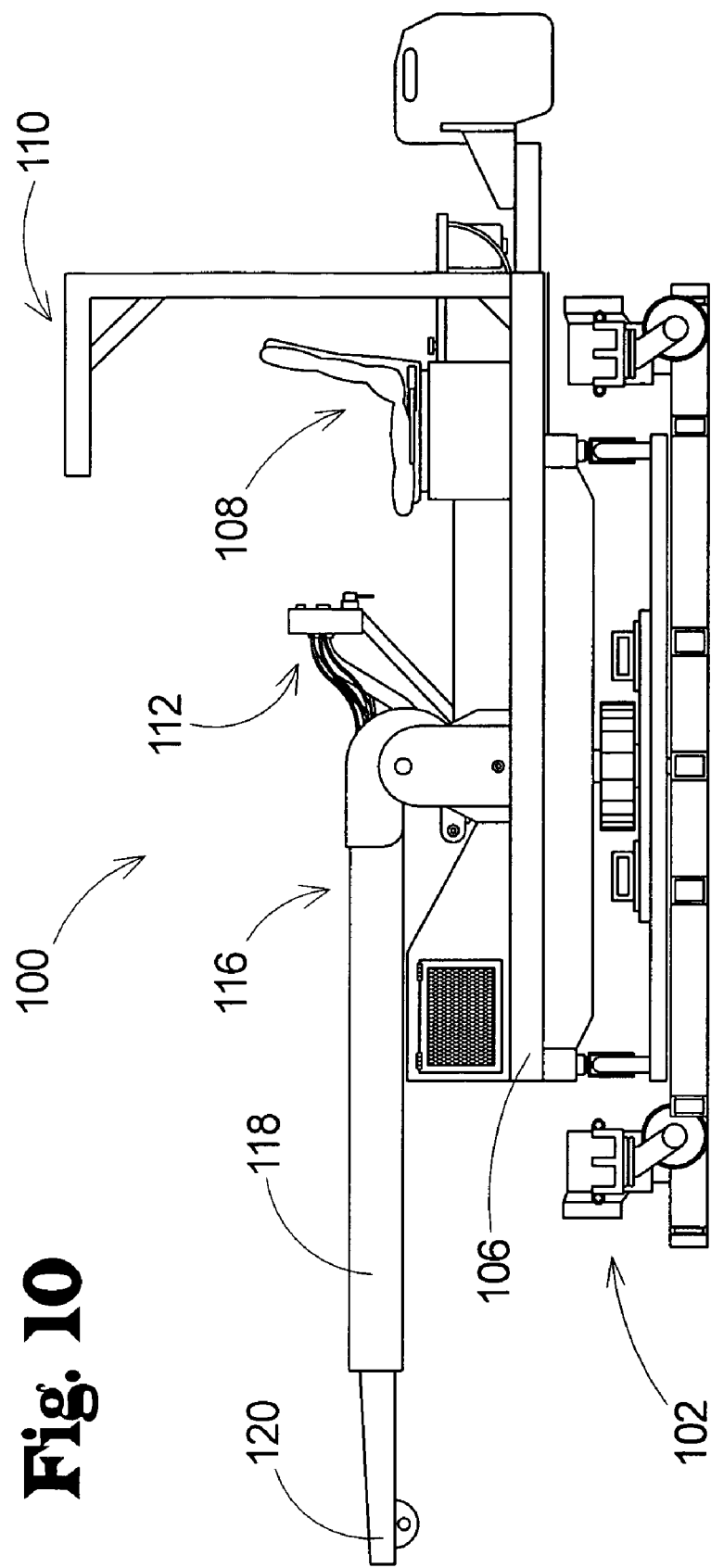
FIG. 10 is a schematic side view of a variation of the present invention.
Figure 11:
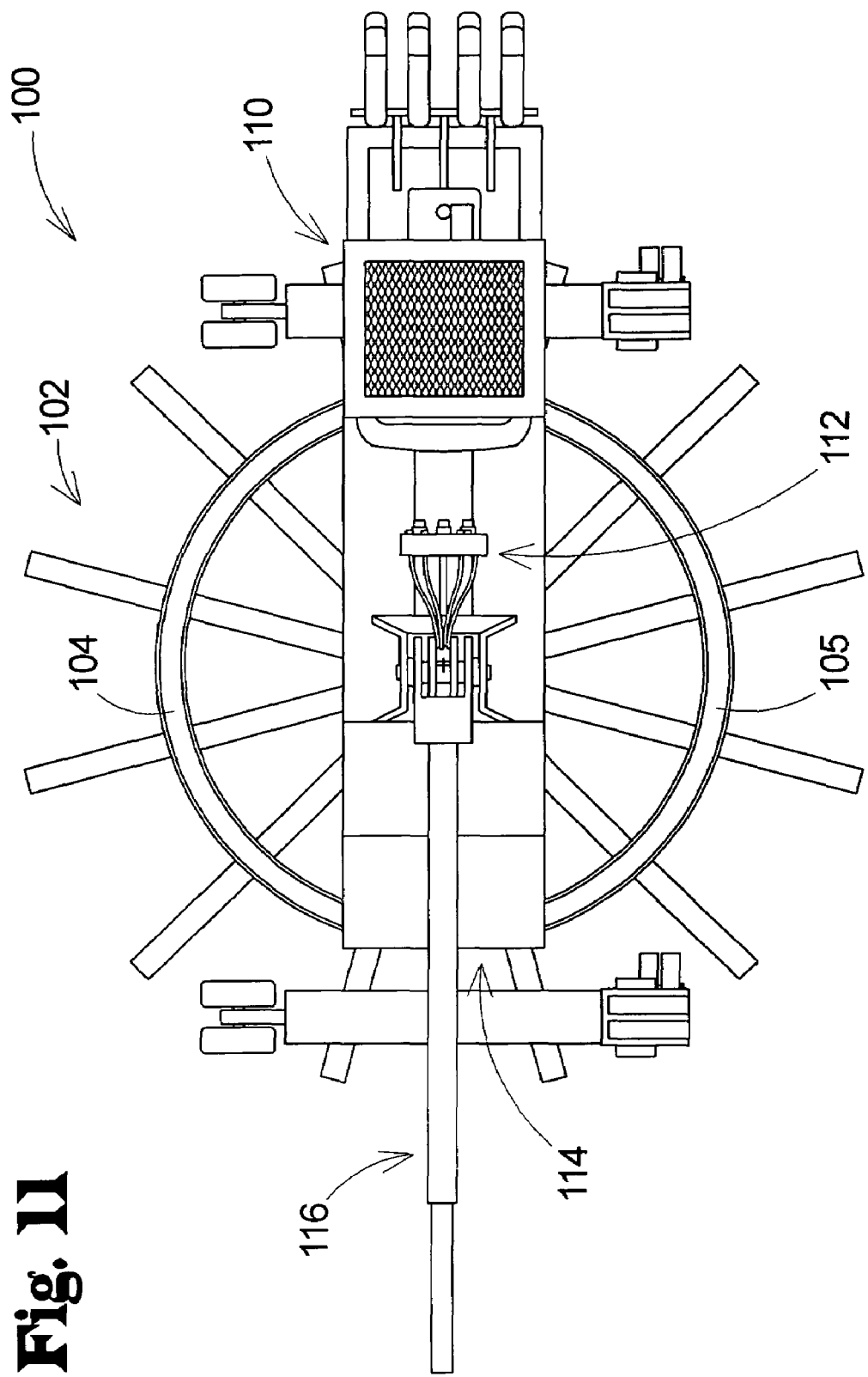
FIG. 11 is a schematic top view of the variation of the present invention shown in FIG. 10.
Figure 12:
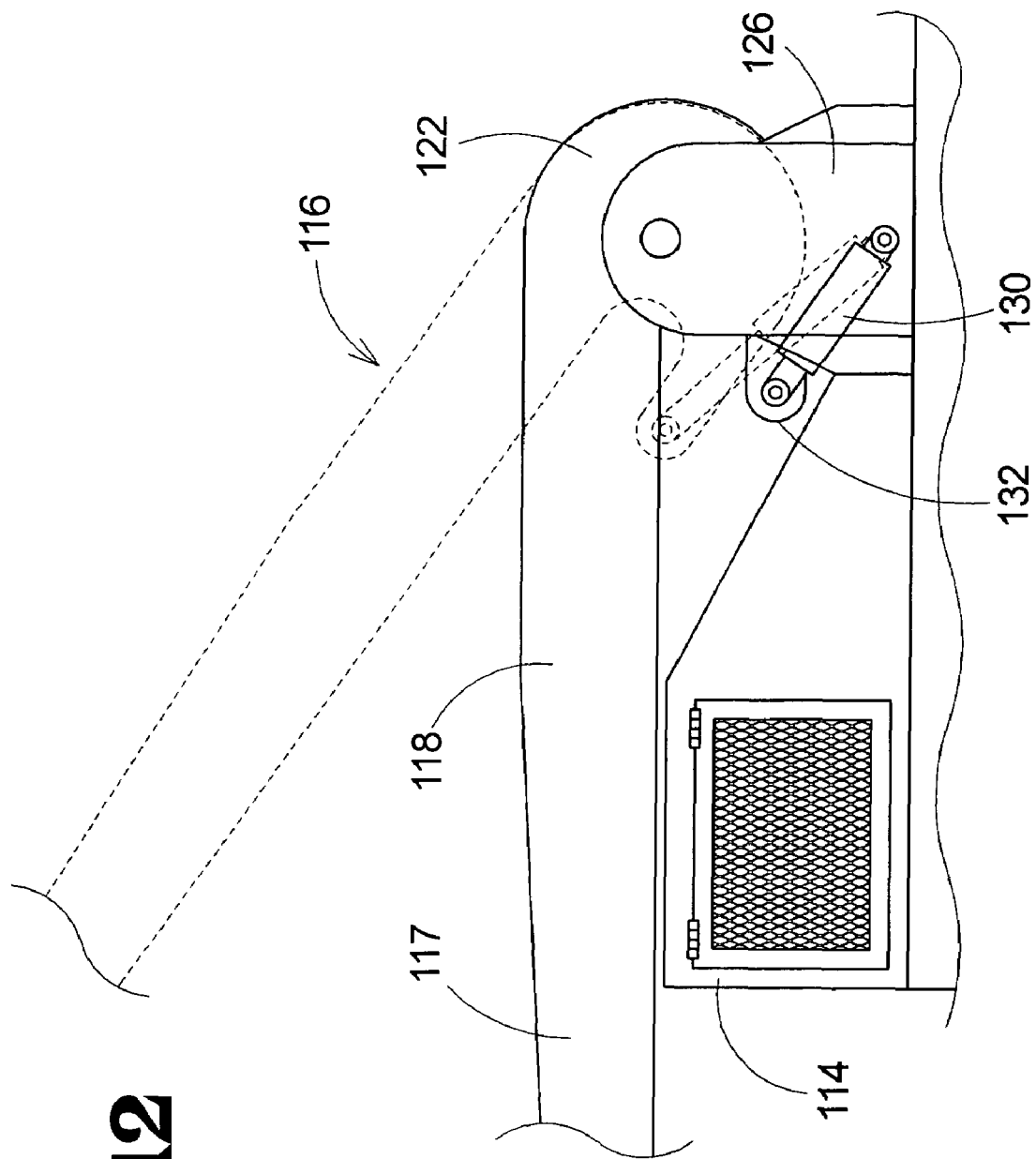
FIG. 12 is a schematic side view of the boom assembly of the variation of the present invention shown in FIG. 10, with a lowered position being shown in solid lines while a raised position is shown in broken lines.

Referring now to FIGS. 10 through 12, a variation 100 of the present invention includes elements of the afore-described embodiment of the invention in a somewhat different arrangement, with improvements to some of the elements. More particularly, the system 100 employs a base assembly 102 that is similar to the base assembly 11 described previously, with one exception being that at least two of the side channel member pieces are combined into a pair of single parts 104, 105 that is substantially semicircular in shape. One of these extended side channel members 104, 105 is positioned on each side of the base channel members, and each of the extended side channel members is provided with apertures as described previously for holding the position of the leg members in the deployed position. The frame member 106 of the system 100 is rotatably mounted on the base assembly 102. The seat assembly 108 of the system 100 is positioned over and above the frame member 106, and a protective partial roll cage or roof 110 that extends forwardly over the seat assembly 108 to help protect the operator in the possible case of tipping or roll over of the system. The control assembly 112 of the system 100 is also positioned over and above the frame member 106 in front of the seat assembly 108. The motor assembly 114 of the system 100 is located in a forward position on the frame member 106.

Turning to FIG. 12, the boom assembly 116 of the system 100 includes an arm 117 with an inboard section 118 and an outboard section 120 that may be telescopically mounted on the inboard section 118. The inboard section 118 has an inner end 122 that is pivotally mounted on a pivot frame 126 that is mounted on the frame member 106. The arm 117 may have a substantially J-shape, with an extension portion 128 extending downwardly and outwardly from the inner end. A hydraulic piston-cylinder assembly 130 may be connected between the pivot frame 126 and a return end 132 of the arm 117 such that extension of the piston-cylinder assembly 130 pivotally raises the arm and retraction of the piston-cylinder assembly pivotally lowers the arm 117.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A slat replacement system for replacing slats forming a portion of a floor of an animal pen, the system comprising:
   a base assembly for resting on a floor of the animal pen, the base assembly being movable between a stored position and a deployed position;
   a frame member being rotatably coupled to the base assembly such that the frame member is rotatable about a substantially vertical axis with respect to the base assembly;
   a lifting assembly mounted on the frame member for lifting and moving slats from the floor of the animal pen;
   a plurality of channel members;
   wherein the base assembly defines a support perimeter over which the weight of the system is distributed by the base assembly, a size of the support perimeter in the deployed position being relatively greater than a size of the support perimeter in the storage position;
   wherein the base assembly comprises a base member and a plurality of leg members mounted on the base member for supporting the base member on the floor of the animal pen;
   wherein at least a portion of the plurality of leg members are pivotable with respect to the base member between the stored position of the base assembly and the deployed position of the base assembly, the portion of the plurality of leg members being pivotable in a plane oriented substantially parallel to the floor when the base assembly is rested on the floor; and
   wherein the plurality of channel members, when mounted on the leg members, form a substantially continuous track and releasably secure the leg member in the deployed position.

2. The slat replacement system of claim 1 wherein the leg members extend outwardly from the base member, the leg members radiating outwardly from a central area on the base member when the base assembly is in the deployed position.

3. The slat replacement system of claim 1 wherein the portion of the plurality of leg members are pivotally connected to the base member.

4. The slat replacement system of claim 1 wherein the stored position of the pivotable leg members is characterized by the leg members being oriented substantially parallel to each other, the deployed position being characterized by the pivotable leg members being oriented in a splayed manner.

5. The slat replacement system of claim 4 wherein each of the leg members in the deployed position is separated from an adjacent one of the leg members by an angle of less than 90 degrees.

6. The slat replacement system of claim 1 wherein the support perimeter defined by the base assembly in the deployed position encompasses an area greater than an area encompassed by the support perimeter defined by the base assembly in the stored position.

7. The slat replacement system of claim 1 wherein the support perimeter defined by the base assembly in the deployed position is substantially circular and the support perimeter defined by the base assembly in the stored position is substantially rectangular.

8. The slat replacement system of claim 1 additionally comprising at least one wheel mounted on the frame member for riding on the track formed by the channel members when mounted on the leg members.

9. The slat replacement system of claim 1 wherein the lifting assembly is pivotally mounted on the frame member to permit pivot movement of the lifting assembly in a substantially vertically-oriented plane.

10. The slat replacement system of claim 1 additionally comprising a balancing assembly on the frame member for balancing the weight of a slat being lifted by the lifting assembly.

11. The slat replacement system of claim 10 wherein the balancing assembly comprises:
 a rack mounted on the frame member; and
 a plurality of balancing weights removably mountable on the rack.

12. The slat replacement system of claim 1
 wherein the leg members extend outwardly from the base member, the leg members radiating outwardly from a central area on the base member when the base assembly is in the deployed position; and
 wherein the stored position of the pivotable leg members is characterized by the leg members being oriented substantially parallel to each other, the deployed position being characterized by the pivotable leg members being oriented in a splayed manner.

13. A slat replacement system for replacing slats forming a portion of a floor of an animal pen, the system comprising:
 a base assembly for resting on a floor of the animal pen, the base assembly being movable between a stored position and a deployed position;
 a frame member being rotatably coupled to the base assembly such that the frame member is rotatable about a substantially vertical axis with respect to the base assembly;
 a lifting assembly mounted on the frame member for lifting and moving slats from the floor of the animal pen;
 wherein the base assembly defines a support perimeter over which the weight of the system is distributed by the base assembly, a size of the support perimeter in the deployed position being relatively greater than a size of the support perimeter in the storage position;
 wherein the base assembly comprises a base member and a plurality of leg members mounted on the base member for supporting the base member on the floor of the animal pen;
 wherein at least a portion of the plurality of leg members are pivotable with respect to the base member between the stored position of the base assembly and the deployed position of the base assembly, the portion of the plurality of leg members being pivotable in a plane oriented substantially parallel to the floor when the base assembly is rested on the floor; and
 wherein each of the leg members extends along an axis, and wherein the axis of at least two of the leg members intersects at a substantially common point located below the lifting assembly when the leg members are in the deployed position of the base assembly;
 wherein the leg members extend outwardly from the base member, the leg members radiating outwardly from a central area on the base member when the base assembly is in the deployed position;
 wherein the portion of the plurality of leg members are pivotally connected to the base member;
 wherein the stored position of the pivotable leg members is characterized by the leg members being oriented substantially parallel to each other, the deployed position being characterized by the pivotable leg members being oriented in a splayed manner;
 wherein each of the leg members in the deployed position is separated from an adjacent one of the leg members by an angle of less than 90 degrees;
 wherein the support perimeter defined by the base assembly in the deployed position encompasses an area greater than an area encompassed by the support perimeter defined by the base assembly in the stored position;
 wherein the support perimeter defined by the base assembly in the deployed position is substantially circular and the support perimeter defined by the base assembly in the stored position is substantially rectangular;
 a plurality of channel members for releasably securing the leg members in the deployed position;
 wherein the plurality of channel members, when mounted on the leg members, form a substantially continuous track;
 at least one wheel mounted on the frame member for riding on the track formed by the channel members when mounted on the leg members;
 wherein the lifting assembly is pivotally mounted on the frame member to permit pivot movement of the lifting assembly in a substantially vertically-oriented plane;
 a balancing assembly on the frame member for balancing the weight of a slat being lifted by the lifting assembly; and
 wherein the balancing assembly comprises:
  a rack mounted on the frame member; and
  a plurality of balancing weights removably mountable on the rack.

14. The slat replacement system of claim 1 wherein the axis of each of the leg members intersects at a substantially common point when the leg members are in the deployed position of the base assembly.

15. The slat replacement system of claim 1 wherein the lifting assembly is pivotally mounted on the frame member to permit pivot movement of the lifting assembly in a substantially vertically-oriented plane about a pivot point; and
 wherein the axis of at least two of the leg members intersects at a substantially common point located below the pivot point of the lifting assembly when the leg members are in the deployed position of the base assembly.

* * * * *